United States Patent
Zhang

(10) Patent No.: US 10,603,796 B2
(45) Date of Patent: Mar. 31, 2020

(54) COMPANION ROBOT AND METHOD FOR CONTROLLING COMPANION ROBOT

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Xue-Qin Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 213 days.

(21) Appl. No.: 15/715,259

(22) Filed: Sep. 26, 2017

(65) Prior Publication Data

US 2018/0111272 A1    Apr. 26, 2018

(30) Foreign Application Priority Data

Oct. 20, 2016 (CN) .......................... 2016 1 0914848

(51) Int. Cl.
| | | |
|---|---|---|
| G05B 15/00 | (2006.01) | |
| G05B 19/00 | (2006.01) | |
| B25J 11/00 | (2006.01) | |
| B62D 57/032 | (2006.01) | |
| G05D 1/02 | (2020.01) | |
| B25J 13/00 | (2006.01) | |

(52) U.S. Cl.
CPC .............. *B25J 11/009* (2013.01); *B25J 11/00* (2013.01); *B25J 13/00* (2013.01); *B62D 57/032* (2013.01); *G05D 1/0214* (2013.01); *G05D 1/0246* (2013.01); *G05D 1/0255* (2013.01); *G05D 2201/0217* (2013.01); *Y10S 901/01* (2013.01)

(58) Field of Classification Search
None
See application file for complete search history.

(56) References Cited

U.S. PATENT DOCUMENTS

| | | | | |
|---|---|---|---|---|
| 7,228,203 | B2* | 6/2007 | Koselka | B25J 5/007 318/568.12 |
| 7,554,282 | B2* | 6/2009 | Nakamoto | B25J 5/00 318/587 |
| 7,818,090 | B2* | 10/2010 | Okamoto | G05D 1/0272 700/253 |
| 8,229,618 | B2* | 7/2012 | Tolstedt | G05D 1/0231 701/23 |
| 8,392,065 | B2* | 3/2013 | Tolstedt | G05D 1/0214 701/41 |

(Continued)

FOREIGN PATENT DOCUMENTS

CN    101530368    9/2009

*Primary Examiner* — Bhavesh V Amin
(74) *Attorney, Agent, or Firm* — ScienBiziP, P.C.

(57) ABSTRACT

A companion robot includes a body, a sensing unit, a positioning unit, a network unit, an input unit, a storage device, and at least one processor. The processor controls the companion robot to receive a destination, generate a walking path of the companion robot according to the destination and a current location of the companion robot, obtain a walking direction and a walking speed of a user, and control the companion robot to walk along the walking path according to the walking direction and the walking speed.

16 Claims, 4 Drawing Sheets

(56) References Cited

U.S. PATENT DOCUMENTS

| | | | |
|---|---|---|---|
| 8,886,383 B2* | 11/2014 | Hyde | A61G 1/0275 701/24 |
| 9,395,723 B2* | 7/2016 | Pari | G05D 1/0276 |
| 2006/0106496 A1* | 5/2006 | Okamoto | G05D 1/0272 700/253 |
| 2007/0016328 A1* | 1/2007 | Ziegler | A47L 5/14 700/245 |
| 2008/0079383 A1* | 4/2008 | Nakamoto | B25J 5/00 318/587 |
| 2009/0024250 A1* | 1/2009 | Oaki | G05D 1/0227 700/245 |
| 2010/0076600 A1* | 3/2010 | Cross | H04W 4/70 700/259 |
| 2010/0179753 A1* | 7/2010 | Agarwal | G01C 21/20 701/465 |
| 2011/0007901 A1* | 1/2011 | Ikeda | H04B 5/02 380/270 |
| 2011/0026770 A1* | 2/2011 | Brookshire | G05D 1/0251 382/103 |
| 2014/0090172 A1* | 4/2014 | Hyde | A61G 1/0275 5/600 |
| 2015/0128547 A1* | 5/2015 | Einecke | A01D 34/008 56/10.2 A |

* cited by examiner

COMPANION ROBOT AND METHOD FOR CONTROLLING COMPANION ROBOT

CROSS-REFERENCE TO RELATED APPLICATIONS

This application claims priority to Chinese Patent Application No. 201610914848.4 filed on Oct. 20, 2016, the contents of which are incorporated by reference herein.

FIELD

The subject matter herein generally relates to a companion robot and a method for controlling the companion robot.

BACKGROUND

Companion robots today are mostly for taking care of infirmed or children indoors. Companion robots for outdoor use are not widespread.

BRIEF DESCRIPTION OF THE DRAWINGS

Implementations of the present technology will now be described, by way of example only, with reference to the attached figures.

DETAILED DESCRIPTION

Figure 1:
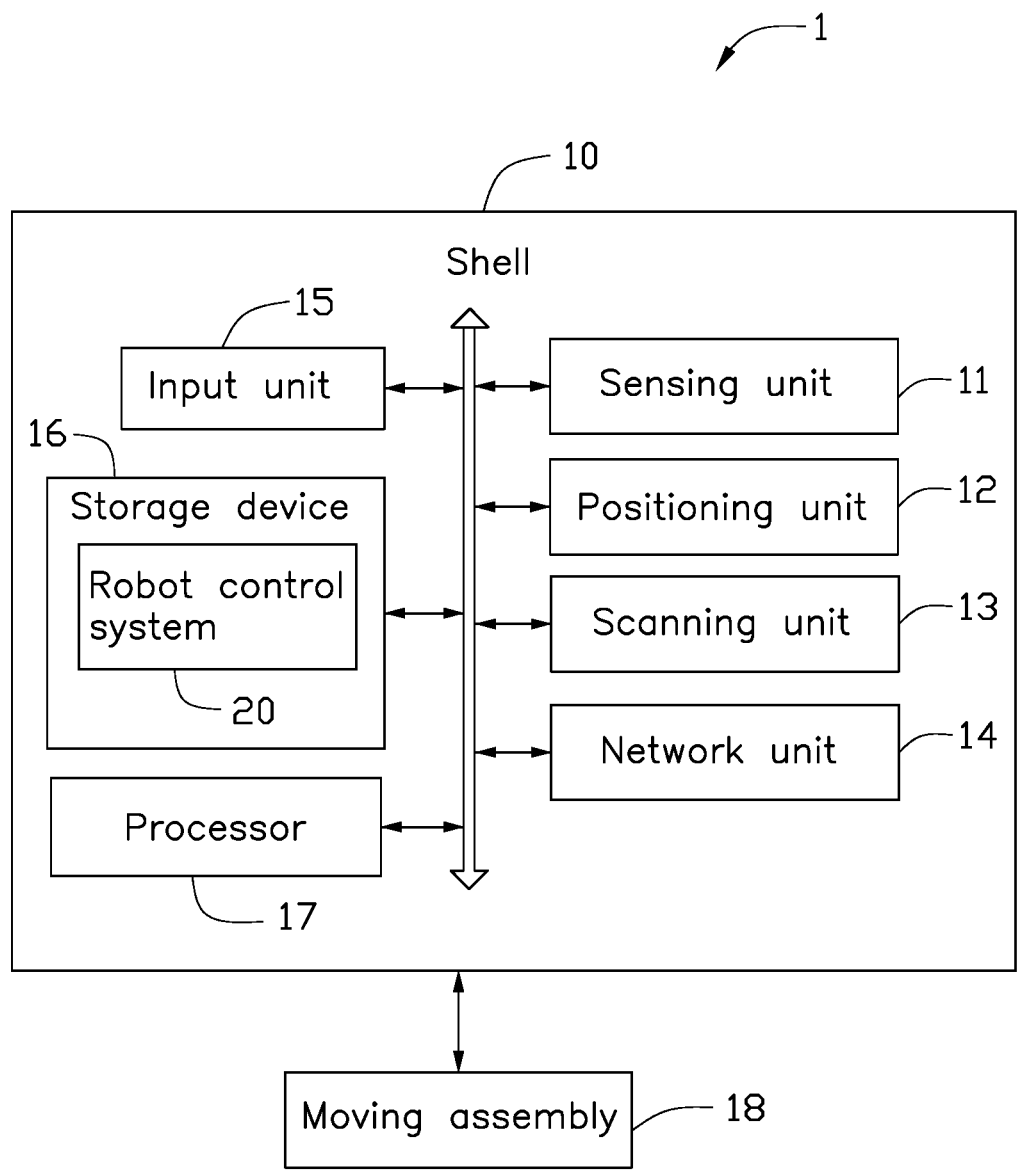
FIG. 1 is a diagram of a control system of an exemplary embodiment of a companion robot.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 illustrates an embodiment of a companion robot 1. The companion robot 1 can include a body 10. The body 10 can include a sensing unit 11, a positioning unit 12, a scanning unit 13, a network unit 14, an input unit 15, a storage device 16, and a processor 17. The sensing unit 11, the positioning unit 12, the scanning unit 13, the network unit 14, the storage device 16, and the processor 17 can be electrically coupled together. A moving assembly 18 can be on the body 10. The moving assembly 18 can be controlled by the processor 17 to control movements of the companion robot 1, such as walking, turning, walking backwards, or the like.

In at least one embodiment, the companion robot 1 can include a driving device (not shown) for driving the moving assembly 18 to move the companion robot 1. In at least one embodiment, the companion robot 1 can include a power source (not shown) for providing power to the companion robot 1.

In at least one embodiment, the companion robot 1 can include a robot control system 20. The robot control system 20 can include a plurality of modules, which include one or more software programs in the form of computerized codes stored in the storage unit 16. The computerized codes can include instructions executed by the processor 17 to provide functions for the modules. The robot control system 20 can control the companion robot 1 to walk along a walking path according to obtained user input and road conditions.

In other embodiments, the storage device 16, the processor 17, the robot control system 20, and/or the input unit 15 can be implemented in an electronic device (not shown) in communication with the companion robot 1, such that the electronic device controls movement of the companion robot 1. The electronic device can receive information, such as a destination, input to the input unit 15 by a user, and the electronic device can send the destination to the companion robot 1. The processor 17, through the robot control system 20, can control the companion robot 1 according to the information. The electronic device can be a mobile phone, a tablet computer, a personal digital assistant, a smart watch, or the like.

In at least one embodiment, the sensing unit 11 is used for sensing a condition of a surrounding environment. The sensing unit 11 can include at least one of a microphone, an image capturing device, a range sensor, and a speed sensor. The microphone can be used to receive audio input. The image capturing device can be used to capture images or video. The range sensor can detect a distance between the companion robot 1 and a user. The speed sensor can detect a speed of the companion robot 1.

The sensing unit 11 can also include an ultrasonic sensor for detecting a distance between the companion robot 1 and obstacles. In at least one embodiment, the sensing unit 11 can include a plurality of ultrasonic sensors spaced substantially 30 degrees apart from each other and located toward a front of the companion robot 1. For example, there can be an ultrasonic sensor located on a front side of the companion robot 1 and two ultrasonic sensors spaced 30 degrees on either side of the ultrasonic sensor located on the front side. The ultrasonic sensor can detect an obstacle by emitting a sound wave, receiving a reflection of the sound wave, and determining a distance between the obstacle and the companion robot 1 according to a time difference between emitting the sound wave and receiving the reflection. A range of each ultrasonic sensor can be substantially 60 degrees. When it is determined that an object is within a predetermined distance from the companion robot 1, the object is determined to be an obstacle to be avoided.

The positioning unit 12 can be a global positioning system for determining a location of the companion robot 1.

The scanning unit 13 can be a laser scanner for obtaining a road condition. The scanning unit 13 can scan ahead to detect a sidewalk, a width of the sidewalk, a boundary between the sidewalk and a driving lane, a green belt, or the like.

The network unit 14 is for communicating with the electronic device. The network unit 14 can communicate with the electronic device through the Internet, a local area network, a wireless network, WIFI, or the like. Wireless technologies can include Global System for Mobile Communications, General Packet Radio Service, Code Division Multiple Access, W-CDMA, CDMA2000, IMT Single Carrier, Enhanced Data Rates for GSM Evolution, Long-Term Evolution, Time-Division LTE, TD-LTE, High Performance Radio Local Area Network, Local Multipoint Distribution Service, Worldwide Interoperability for Microwave Access, ZigBee, BLUETOOTH, Flash Orthogonal Frequency-Division Multiplexing, High Capacity Spatial Division Multiple Access, Universal Mobile Telecommunications System, UMTS Time-Division Duplexing, Evolved High Speed Packet Access, Time Division Synchronous Code Division Multiple Access, Evolution-Data Optimized, Digital Enhanced Cordless Telecommunications, or the like.

The input unit 15 can be a touch screen or a keypad. The touch screen can be a liquid crystal display, an organic light-emitting diode display, or the like.

The storage device 16 can be in the companion robot 1 or be located outside of the companion robot 1, such as a secure digital card, a smart media card, or other external device. The storage device 16 can store basic user information, a walking speed, map information, or the like.

The processor 17 can be a central processing unit or any other kind of chip for implementing instructions.

Figure 2:
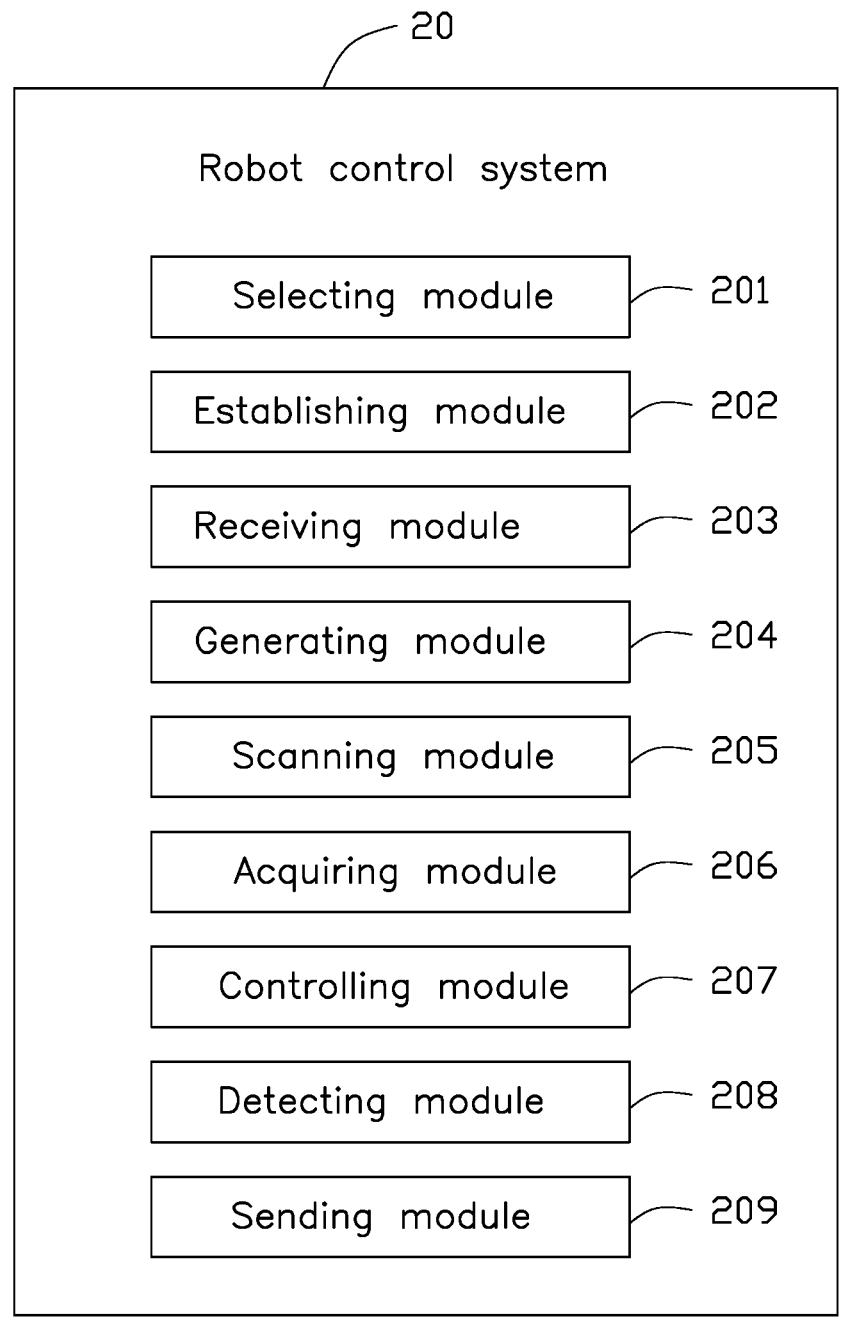
FIG. 2 is a diagram of a robot control system of the companion robot.

Referring to FIG. 2, the robot control system 20 can include a selection module 201, an establishing module 202, a receiving module 203, a generating module 204, a scanning module 205, an obtaining module 206, a controlling module 207, a detecting module 208, and a sending module 209. In at least one exemplary embodiment, the modules 201-209 include computerized codes in the form of one or more programs that may be stored in the storage device 16. The computerized codes include instructions that can be executed by the processor 17.

The selecting module 201 can provide two modes of operation to be selected by a user. The two modes of operation can be a first mode and a second mode.

In the present embodiment, when the use does not want to waste time, the user is not familiar with the current environment, or the user is a disabled people (e.g., a blind person), he/she can select the first mode, the companion robot 1 can lead the user along a walking path according to a preset destination input by the user in the first mode, so as to provide a safest and most convenient path the user.

In the present embodiment, when the second mode is selected, the sensing unit 11 can detect hand gestures or voice commands of the user to set a destination of the companion robot 1, or the electronic device can set the destination of the companion robot 1. For example, the user can say, "follow me" to the companion robot 1 to control the companion robot 1 to follow the user.

In at least one embodiment, the selecting module 201 can select the mode of operation through the input unit 15. For example, if the input unit 15 is a touch screen, the selecting module 201 can present the modes of operation on the touch screen to be selected by the user.

The establishing module 202 can establish basic user information. The companion robot 1 can recognize the user according to the basic user information. In at least one embodiment, the establishing module 202 can obtain the basic user information through the sensing unit 11 and save the basic user information in the storage device 16.

In at least one embodiment, the basic user information can include an appearance, dress, and voice of the user. For example, the appearance and dress can be obtained by the image capturing device. When the companion robot 1 captures images of the user that match the images stored in the storage device 16, then the companion robot 1 can recognize the user.

The establishing module 202 can also use the microphone to capture the user's voice and store the user's voice as part of the basic user information. When the microphone captures the voice of the user which matches the voice stored in the storage device 16, then the companion robot 1 can recognize the voice of the user.

In other embodiments, the establishing module 202 can obtain the basic user information from the electronic device which communicates with the companion robot 1. The user can input the basic user information through the electronic device, and send the basic user information to the companion robot 1 to store.

The receiving module 203 can receive the destination input by the user. When the first mode is selected, the receiving module 203 receives a destination through the input unit 15, through the microphone, or from the electronic device as an initial destination. When the second mode is selected, the receiving module 203 can recognize hand gestures captured by the image capturing device, voice commands captured by the microphone, or instructions sent by the electronic device to set an initial destination of the companion robot 1. For example, the user can point to the right or say, "turn right" to control the companion robot 1 to turn right.

The generating module 204 can generate a walking path according to the destination and a current location of the companion robot 1. The current location can be obtained from the positioning unit 12. The generating module 204 generates the walking path on a map stored in the storage device 16 according to the destination and the current location of the companion robot 1.

The establishing module 202 can also set an initial walking speed of the companion robot 1. The initial walking speed can be set by the establishing module 202, but it is to be understood that the walking speed can be changed during a course of walking.

The scanning module 205 can obtain road conditions of the current location. The scanning module 205 can obtain the road conditions through the scanning unit 13. The scanning module 205 can detect a sidewalk, a boundary between the sidewalk and a driving path, a width of the sidewalk, a green belt, or the like.

The obtaining module 206 can obtain a walking direction and a walking speed of the user. The walking direction and walking speed of the user can be obtained from the electronic device being carried by the user. For example, the electronic device can include a GPS, a gyroscope, and a speed sensor for detecting the walking direction and walking speed of the user.

The controlling module 207 can control the companion robot 1 to walk along the walking path according to the obtained walking direction and walking speed of the user. The controlling module 207 can also adjust the walking speed of the companion robot 1 in real time according to the walking speed of the user. For example, when a walking speed of the user is detected to be faster than a walking speed of the companion robot 1 and a distance between the user and the companion robot 1 is greater than a predetermined distance, the controlling module 207 can control the companion robot 1 to walk faster, and when a walking speed of the user is detected to be slower than a walking speed of the companion robot 1 and a distance between the user and the companion robot 1 is less than a predetermined distance, the controlling module 207 can control the companion robot 1 to walk slower. The distance between the user and the companion robot 1 can be measured by the range sensor.

The detecting module 208 can determine whether the companion robot 1 is stuck. In at least one embodiment, the detecting module 208 can determine that the companion robot 1 is stuck when a speed of the companion robot 1 is 0 for a predetermined time duration. The detecting module 208 can further determine that the companion robot 1 is not stuck when the speed of the companion robot 1 is not 0.

The sending module 209 can send a current state of the companion robot 1 to the electronic device. In at least one embodiment, the current state can include a current location of the companion robot 1 and images or video captured by the image capturing device. The user can input control information to the electronic device according to the current state, and the electronic device can send the control information to the companion robot 1.

The receiving module 203 can receive the control information sent from the electronic device. In at least one embodiment, the control information can control the walking direction and walking speed of the companion robot 1 and control the companion robot 1 to broadcast a message, for example. The controlling module 207 controls the companion robot 1 to execute corresponding operations according to the control information. In at least one embodiment, the message and a volume of the message can be preset by the user. For example, the message can say, "I'm over here", and the volume of the message can be set to over 90 decibels.

Figure 3:
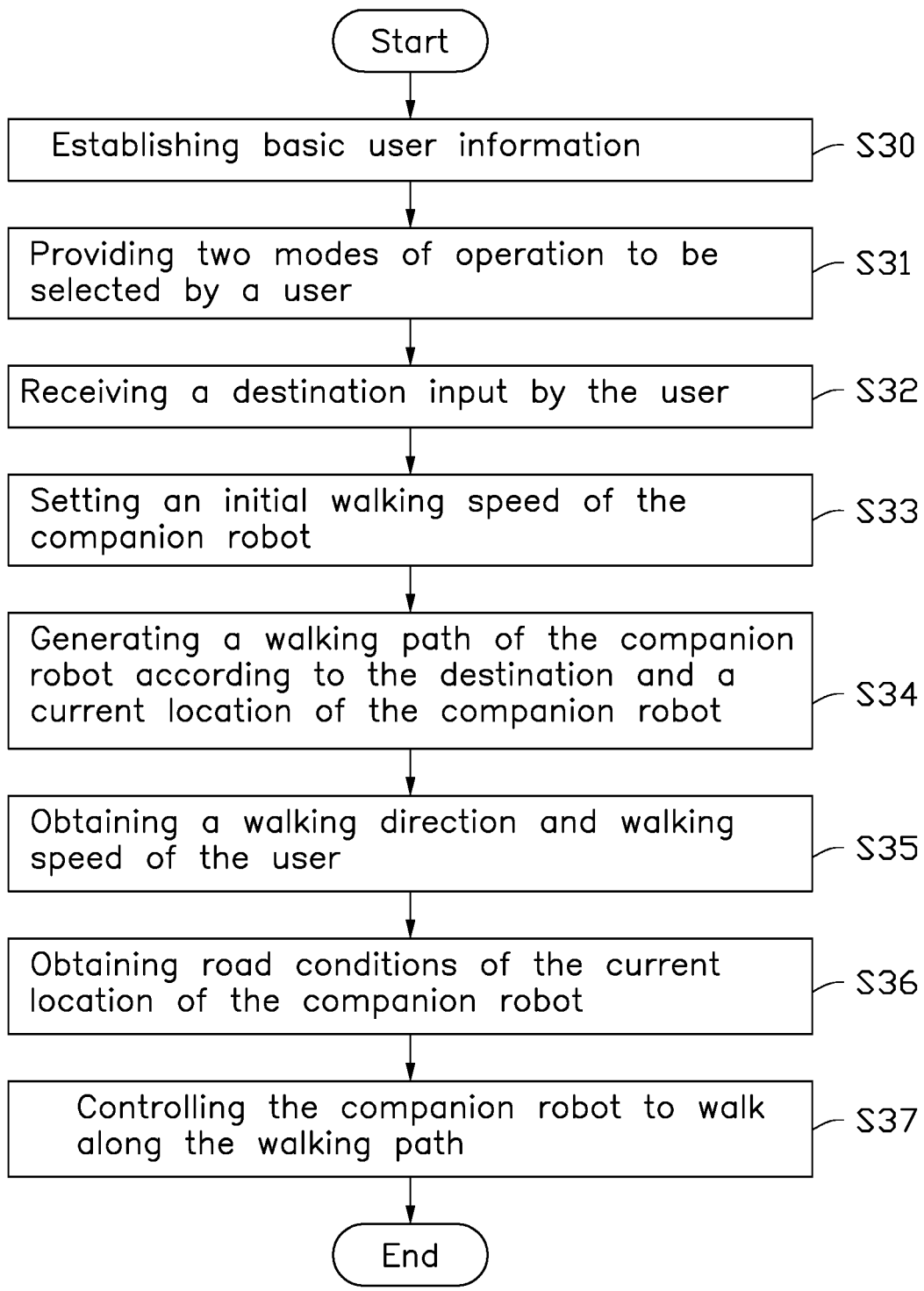
FIG. 3 is a flowchart diagram of a method for controlling the companion robot.

FIG. 3 illustrates a flowchart of an exemplary method for controlling a companion robot. The example method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S30.

At block S30, basic user information can be established and saved in a storage device of the companion robot. In at least one embodiment, the basic user information can be established by obtaining an appearance, dress, and voice of the user. For example, the appearance and dress can be obtained by an image capturing device of the companion robot. When the companion robot captures images of the user that match the images stored in the storage device, then the companion robot can recognize the user.

The basic user information can further include a voice of the user captured by a microphone. When the microphone captures the voice of the user which matches the voice stored in the storage device, then the companion robot can recognize the voice of the user.

In other embodiments, the basic user information can be obtained from an electronic device in communication with the companion robot. The user can input the basic user information through the electronic device and send the basic user information to the companion robot to store.

At block S31, two modes of operation to be selected by a user can be provided. The two modes of operation can be a first mode and a second mode.

In the present embodiment, when the user does not want to waste time, is not familiar with the current environment, or is disabled (e.g., a blind person), he/she can select the first mode. The companion robot can lead the user along a walking path according to a preset destination input by the user in the first mode, so as to provide a safest and most convenient path for the user.

In the present embodiment, when the second mode is selected, the companion robot can detect hand gestures or voice commands of the user to set a destination of the companion robot, or the electronic device can set the destination of the companion robot. For example, the user can say, "follow me" to the companion robot to control the companion robot to follow the user.

At block S32, a destination input by the user can be received by the companion robot. When the first mode is selected, the destination can be received through an input unit, through a microphone, or from the electronic device as an initial destination. When the second mode is selected, the companion robot can recognize hand gestures captured by an image capturing device, voice commands captured by a microphone, or instructions sent by the electronic device to set an initial destination of the companion robot. For example, the user can point to the right or say, "turn right" to control the companion robot to turn right.

At block S33, an initial walking speed of the companion robot can be set. The initial walking speed can be preset, but it is to be understood that the walking speed can be changed during a course of walking.

At block S34, a walking path of the companion robot according to the destination and a current location of the companion robot can be generated. The current location can be obtained from a global positioning unit in the companion robot. The walking path can be generated on a map stored in a storage device of the companion robot according to the destination and the current location of the companion robot.

At block S35, a walking direction and walking speed of the user can be obtained. The walking direction and walking speed can be obtained from the electronic device being carried by the user. For example, the electronic device can include a GPS, a gyroscope, and a speed sensor for detecting the walking direction and walking speed of the user.

At block S36, road conditions of the current location of the companion robot can be obtained. The road conditions of the current location can be obtained by a scanning unit in the companion robot. The scanning unit can detect a sidewalk, a boundary between the sidewalk and a driving path, a width of the sidewalk, a green belt, or the like.

At block S37, the companion robot can be controlled to walk along the walking path according to the obtained walking direction and walking speed of the user. The walking speed of the companion robot can be adjusted in real time according to the walking speed of the user. For example, when a walking speed of the user is detected to be faster than a walking speed of the companion robot and a distance between the user and the companion robot is greater than a predetermined distance, the companion robot can walk faster, and when a walking speed of the user is detected to be slower than a walking speed of the companion robot and a distance between the user and the companion robot is less than a predetermined distance, the companion robot can walk slower. The distance between the user and the companion robot can be measured by a range sensor of the companion robot.

The companion robot can also be controlled to avoid obstacles along the walking path. For example, the companion robot can include an ultrasonic sensor for detecting a distance between the companion robot 1 and the obstacles. In at least one embodiment, a plurality of ultrasonic sensors can be spaced substantially 30 degrees apart from each other and located toward a front of the companion robot. A range of each ultrasonic sensor can be substantially 60 degrees. When it is determined that an object is within a predetermined distance from the companion robot, the object is determined to be an obstacle to be avoided.

Figure 4:
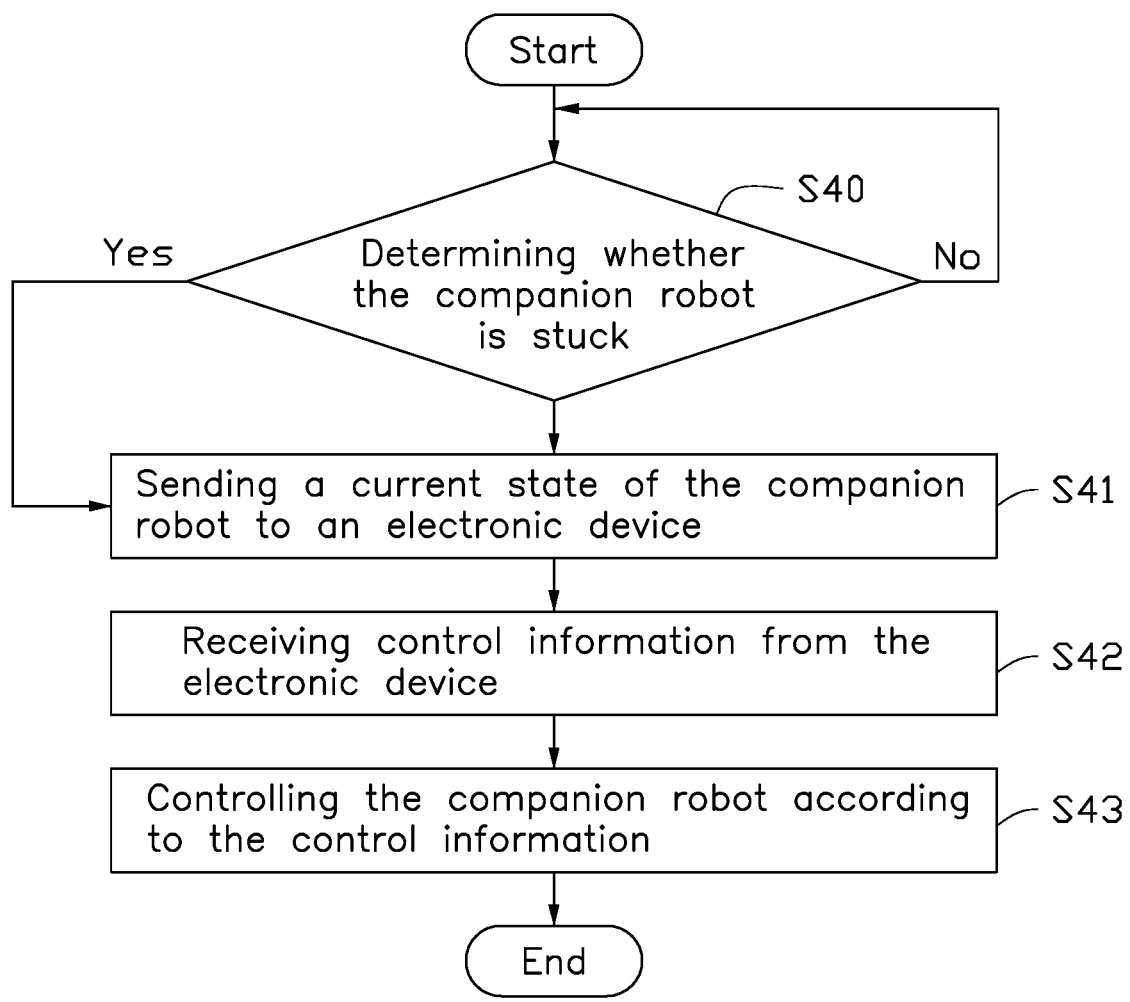
FIG. 4 is a flowchart diagram of a method for controlling the companion robot when the companion robot is stuck.

FIG. 4 illustrates a flowchart of an exemplary method for controlling a companion robot if the companion robot becomes stuck. The example method is provided by way of example, as there are a variety of ways to carry out the method. The method described below can be carried out using the configurations illustrated in FIGS. 1-2, for example, and various elements of these figures are referenced in explaining the example method. Each block shown in FIG. 4 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S40.

At block S40, the companion robot can determine whether the companion robot is stuck. The companion robot can determine that the companion robot is stuck when a speed of the companion robot is 0 for a predetermined time duration. The companion robot can further determine that the companion robot is not stuck when the speed of the companion robot is not 0.

At block S41, the companion robot can send a current state of the companion robot to the electronic device. The current state can include a current location of the companion robot and images or video captured by the image capturing device. The user can input control information to the electronic device according to the current state, and the electronic device can send the control information to the companion robot.

At block S42, the companion robot can receive the control information from the electronic device. The companion robot executes corresponding operations according to the control information. The control information can control the walking direction and walking speed of the companion robot and control the companion robot to broadcast a message, for example.

At block S43, the companion robot can be controlled according to the control information. The message and a volume of the message can be preset by the user. For example, the message can say, "I'm over here", and the volume of the message can be set to over 90 decibels.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A companion robot comprising:
    an input unit;
    a microphone;
    an image capturing device;
    a positioning unit;
    a storage device; and
    at least one processor, wherein the storage device stores one or more programs, which when executed by the at least one processor, cause the at least one processor to:
    provide two modes of operation, the two modes of operation being selectable, the two modes of operation comprising a first mode and a second mode;
    receive a destination through the input unit when the companion robot is in the first mode;
    recognize hand gestures captured by the image capturing device, and voice commands captured by the microphone, to set the destination when the companion robot is in the second mode;
    generate a walking path of the companion robot according to the destination and a current location of the companion robot, the current location obtained by the positioning unit;
    obtain a walking direction and a walking speed of a target; and
    control the companion robot to walk along the walking path according to the walking direction and the walking speed of the target.

2. The companion robot of claim 1, further comprising a network unit, wherein the network unit communicates with an electronic device; the processor obtains the walking direction and the walking speed of the target from the electronic device through the network unit.

3. The companion robot of claim 1, further comprising a scanning device for detecting a road condition; wherein the processor is further configured to obtain a road condition from the scanning device.

4. The companion robot of claim 1, further comprising a sensing unit, wherein the sensing unit comprises at least one of a microphone, an image capturing device, a range sensor, a speed sensor, and an ultrasonic sensor.

5. The companion robot of claim 4, wherein the microphone is used for receiving voice input from a target; the image capturing device is used for collecting images or videos; the range sensor is used for determining a distance between the companion robot and the target; the speed sensor is used for detecting a speed of the companion robot; the ultrasonic sensor is used for detecting obstacles along the walking path.

6. The companion robot of claim 5, wherein:
when a walking speed of the target is detected to be faster than a walking speed of the companion robot and a distance between the target and the companion robot is greater than a predetermined distance, the processor controls the companion robot to walk faster; and
when a walking speed of the target is detected to be slower than a walking speed of the companion robot and a distance between the target and the companion robot is less than a predetermined distance, the processor controls the companion robot to walk slower.

7. The companion robot of claim 1, wherein the processor is further configured to establish basic target information of the target; the companion robot uses the basic target information to recognize the target.

8. The companion robot of claim 1, wherein the processor is further configured to:
determine whether the companion robot is stuck; and
send a message to an electronic device informing that the companion robot is stuck.

9. The companion robot of claim 8, wherein the processor is further configured to:
receive control information from the electronic device; and
control the companion robot according to the control information.

10. The companion robot of claim 9, wherein the control information comprises the walking direction and a walking speed of the companion robot and the processor controls the companion robot to broadcast a message.

11. A method implemented by a companion robot for controlling the companion robot, the companion robot comprising a positioning unit, the method comprising:
providing two modes of operation, the two modes of operation being selectable, the two modes of operation comprising a first mode and a second mode;
receiving a destination through an input unit when the companion robot is in the first mode;
recognizing hand gestures captured by a image capturing device, and voice commands captured by a microphone, to set the destination when the companion robot is in the second mode;
generating a walking path of the companion robot according to the destination and a current location of the companion robot, wherein the current location is obtained by the positioning unit;
obtaining a walking direction and a walking speed of a target; and
controlling the companion robot to walk along the walking path according to the walking direction and the walking speed of the target.

12. The method of claim 11, wherein:
when a walking speed of the target is detected to be faster than a walking speed of the companion robot and a distance between the target and the companion robot is greater than a predetermined distance, the companion robot is controlled to walk faster; and
when a walking speed of the target is detected to be slower than a walking speed of the companion robot and a distance between the target and the companion robot is less than a predetermined distance, the companion robot is controlled to walk slower.

13. The method of claim 11 further comprising establishing basic target information of the target; the basic target information configured to recognize the target.

14. The method of claim 11 further comprising:
determining whether the companion robot is stuck; and
sending a message to the electronic device informing that the companion robot is stuck.

15. The method of claim 14 further comprising:
receiving control information from the electronic device; and
controlling the companion robot according to the control information.

16. The method of claim 15, wherein the control information comprises the walking direction and walking speed of the companion robot and the processor controls the companion robot to broadcast a message.

* * * * *